United States Patent [19]

Duret et al.

[11] Patent Number: 5,433,073
[45] Date of Patent: Jul. 18, 1995

[54] EXHAUST LINE WITH CATALYST FOR TWO-STROKE INTERNAL-COMBUSTION ENGINES

[75] Inventors: Pierre Duret, Sartrouville; Gaëtan Monnier, Rueil Malmaison, both of France

[73] Assignee: Institut Francais du Petrole, Rueil Malmaison Cedex, France

[21] Appl. No.: 142,410
[22] PCT Filed: Mar. 10, 1993
[86] PCT No.: PCT/FR93/00234
 § 371 Date: Nov. 24, 1993
 § 102(e) Date: Nov. 24, 1993
[87] PCT Pub. No.: WO93-18285
 PCT Pub. Date: Sep. 16, 1993

[30] Foreign Application Priority Data

Mar. 10, 1992 [FR] France ............... 92 02936

[51] Int. Cl.6 ................................ F01N 3/10
[52] U.S. Cl. ...................... 60/288; 60/302
[58] Field of Search ............ 60/288, 302, 298

[56] References Cited

U.S. PATENT DOCUMENTS

| | | | |
|---|---|---|---|
| 3,788,284 | 1/1974 | Gardner | 60/288 |
| 3,961,478 | 6/1976 | Lange | 60/288 |
| 3,963,447 | 6/1976 | Hayashi | 60/288 |
| 3,972,184 | 8/1976 | Warren | 60/288 |
| 4,215,538 | 8/1980 | Steinwart et al. | 60/302 |
| 4,735,046 | 4/1988 | Iwai | 60/295 |
| 4,848,082 | 7/1989 | Takahashi et al. | 60/285 |
| 4,900,282 | 2/1990 | Takahashi et al. | 60/302 |
| 5,070,694 | 12/1991 | Whittenberger | 60/300 |
| 5,203,167 | 4/1993 | Lassanske et al. | 60/302 |
| 5,212,949 | 5/1993 | Shiozawa | 60/302 |
| 5,239,825 | 8/1993 | Shibata | 60/302 |
| 5,277,026 | 1/1994 | Boll et al. | 60/302 |

FOREIGN PATENT DOCUMENTS

| | | | |
|---|---|---|---|
| 404320 | 12/1990 | European Pat. Off. | |
| 417412 | 3/1991 | European Pat. Off. | |
| 2345383 | 3/1975 | Germany | 60/302 |
| 2432285 | 1/1976 | Germany | |
| 3903879 | 8/1990 | Germany | |
| 186051 | 11/1982 | Japan | |

*Primary Examiner*—Ira S. Lazarus
*Assistant Examiner*—L. Heyman
*Attorney, Agent, or Firm*—Antonelli, Terry, Stout & Kraus

[57] ABSTRACT

A catalyst is integrated into a cylinder block of an engine and positioned near at least one exhaust port thereof. A separation wall is provided for dividing the exhaust flow into two branches, one of which contains the catalyst. A control device responsive to at least one engine parameter selectively seals one of the branches such that exhaust is either passed through the catalyst or around the catalyst. A coolant passage is provided adjacent the catalyst to prevent overheating.

10 Claims, 5 Drawing Sheets

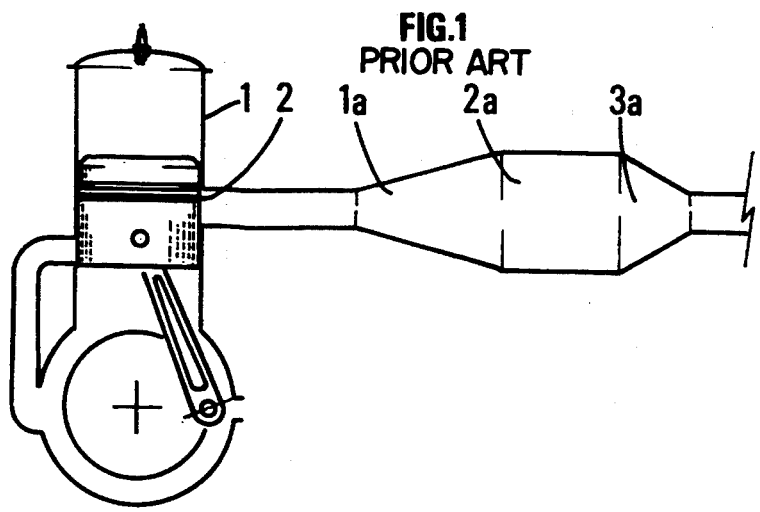
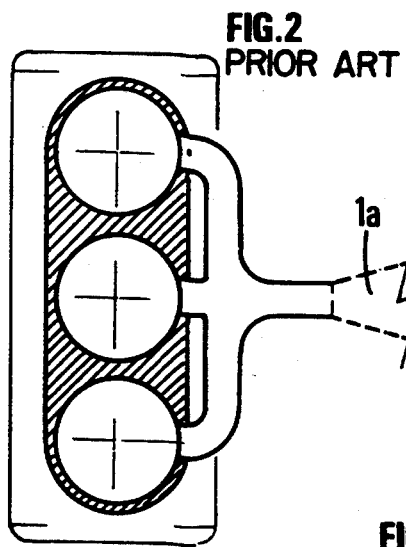
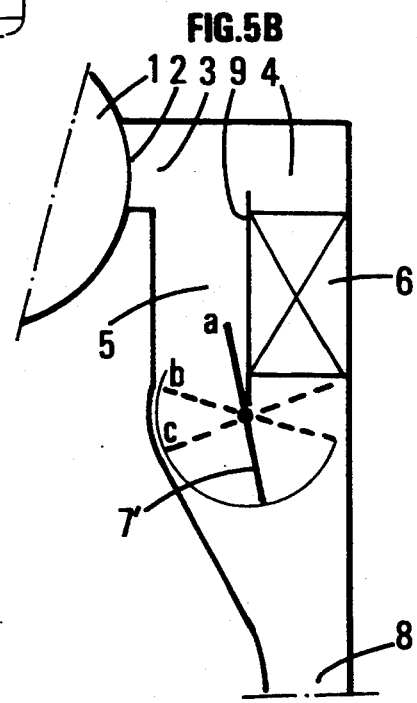
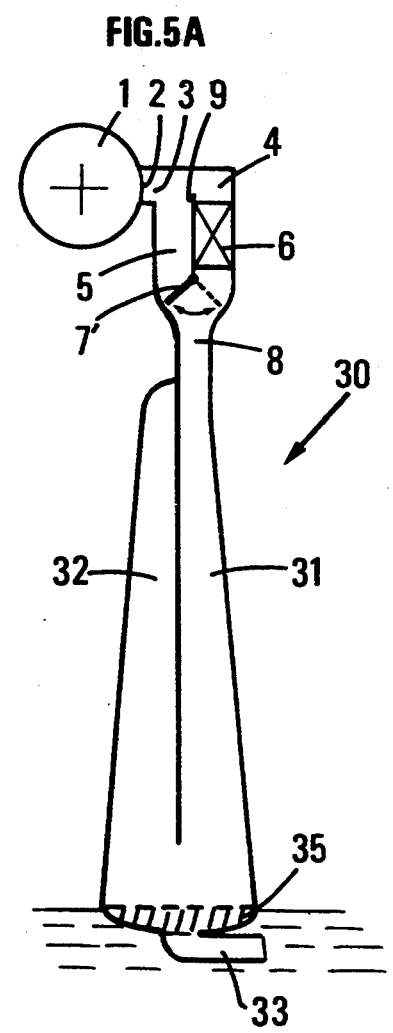
FIG.1 PRIOR ART
FIG.2 PRIOR ART
FIG.5A
FIG.5B

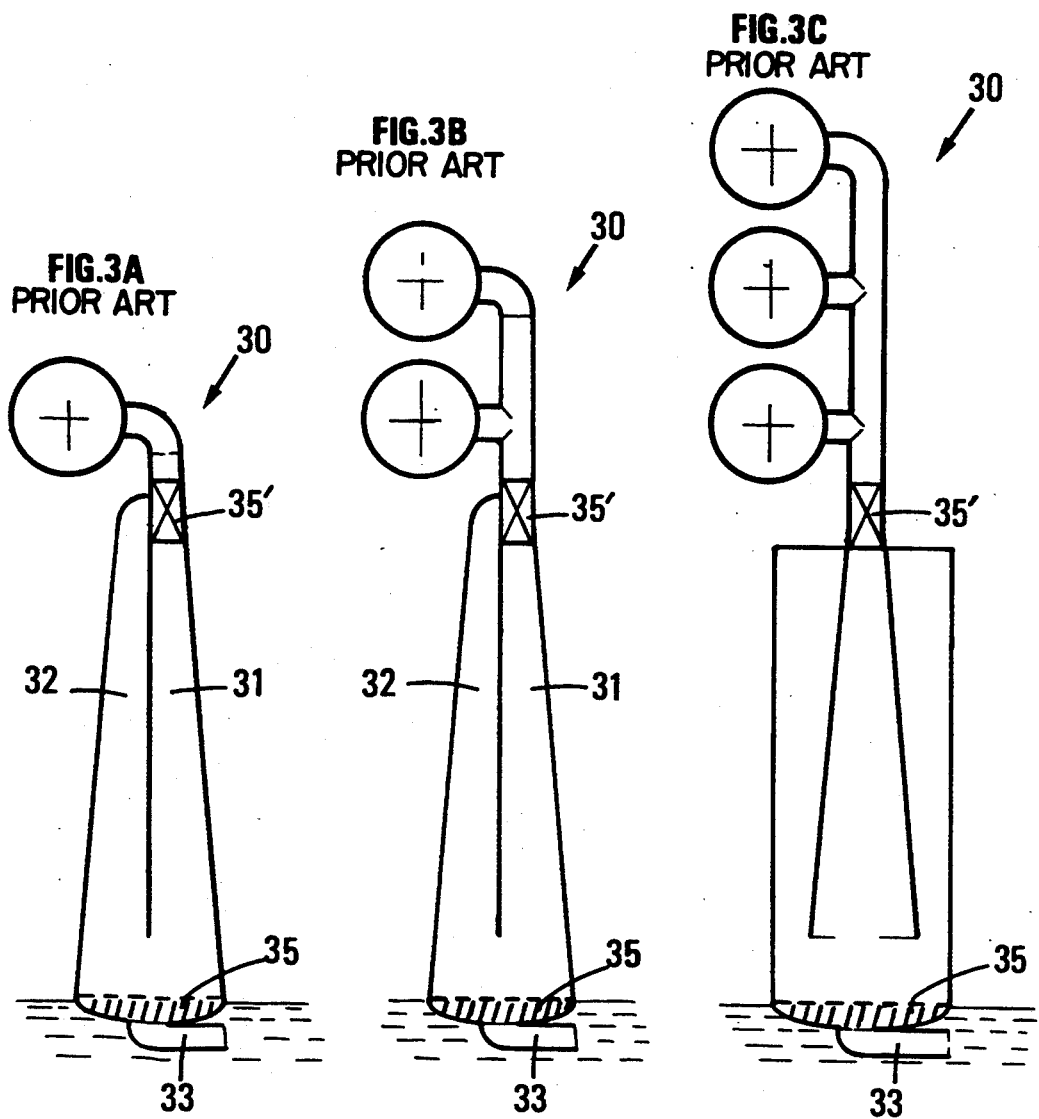
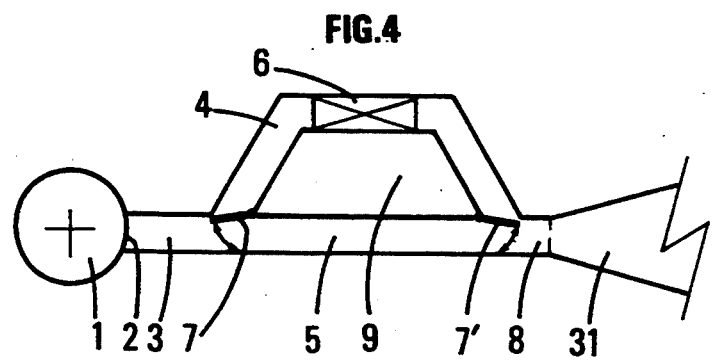

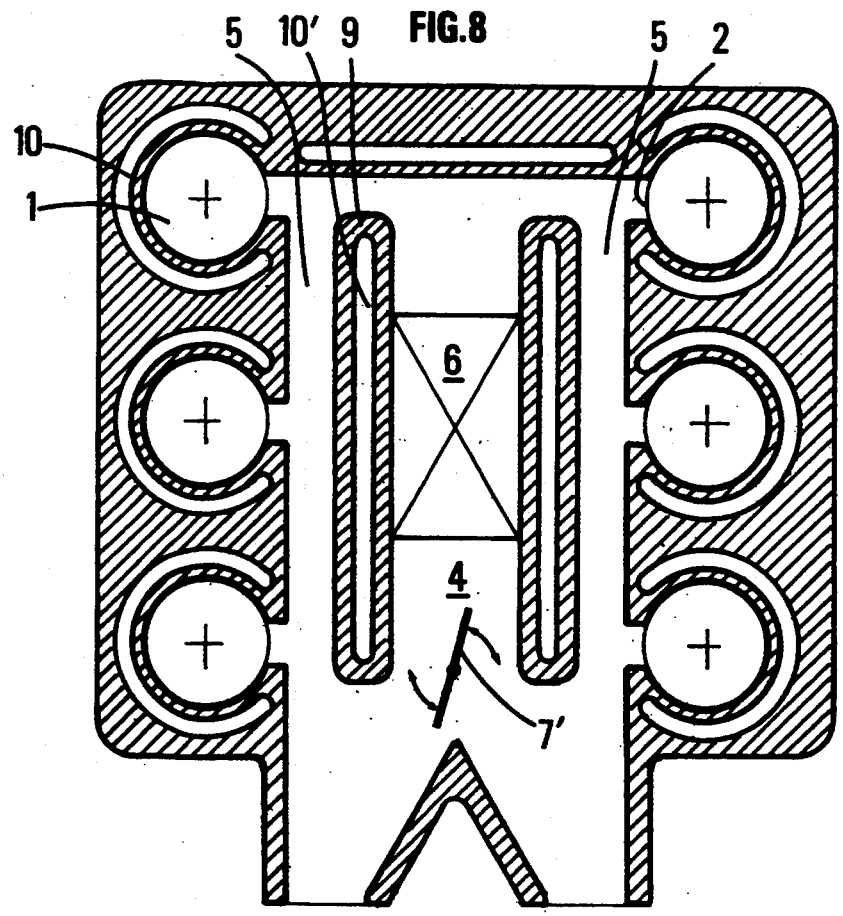
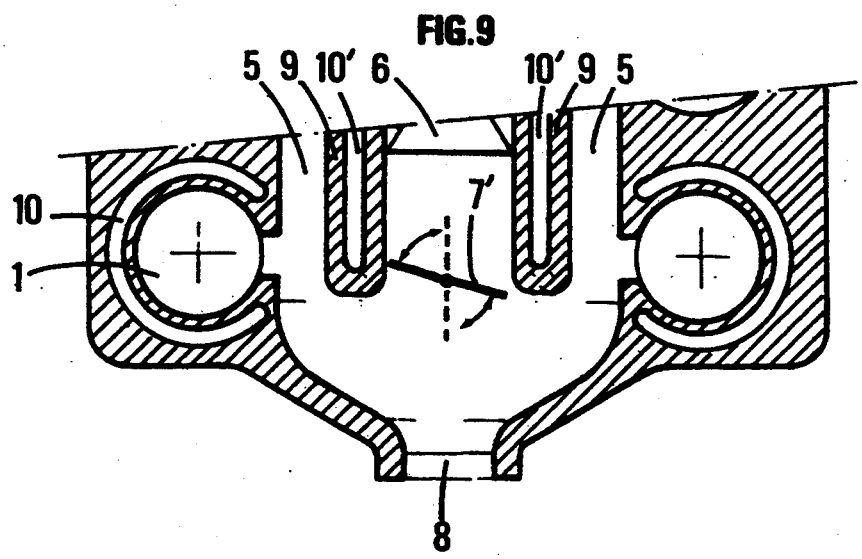

5,433,073

EXHAUST LINE WITH CATALYST FOR TWO-STROKE INTERNAL-COMBUSTION ENGINES

BACKGROUND OF THE INVENTION

The present invention relates to exhaust lines for two-stroke internal-combustion engines, comprising at least one catalyst.

The invention may be particularly applied to outboard engines, for which size constraints are very severe.

According to the prior art such as shown for example in FIG. 1, an optimized exhaust line of a two-stroke engine may consist of a divergent zone $1a$ positioned downstream from port 2 or from the exhaust ports, followed by a constant section zone $2a$ and possibly by a convergent zone $3a$.

This geometry profits from the acoustic effects of the pressure waves and thereby improves the filling, and therefore the efficiency of two-stroke engines, over the widest possible speed range. More precisely, this type of exhaust line is designed, on the one hand, to favour the extraction of the waste gases during the scavenging stroke and, on the other hand, to avoid fresh gas losses at the exhaust, at the end of the scavenging stroke. To achieve these two functions, the exhaust line must allow formation of a depression wave at the level of the exhaust port during the scavenging stroke around the bottom dead center, and then formation of a compression wave at the level of this port at the end of the scavenging stroke, before the exhaust line closes.

The geometry defined above allows these characteristics to be achieved: in fact, the depression wave is obtained through the divergent zone $1a$ while the compression wave may be obtained by means of the convergent part $3a$ of such an exhaust line.

It should however be noted that, in multicylinder engines, the compression wave may be obtained by using a lay-out such as that shown in FIG. 2 between the exhaust manifolds of the various cylinders. This lay-out will allow the angular offset between the various cylinders to be used since the compression wave generated through the opening of the exhaust port of a cylinder, which reaches the level of the exhaust port(s) of another cylinder shortly before it closes, that is at the end of the scavenging thereof, enables compression to be achieved in this cylinder. Of course, the opening times of the ports and the lengths of the individual manifolds must be calculated appropriately, according to the number of cylinders of the engine.

In FIG. 2 relating to a multicylinder engine according to the prior art, the divergent part $1a$ appears in dashed lines because it might not exist. In this case, only a compression wave is created, as shown above. The depression wave not being present, the running and in particular the power of the engine is decreased in relation to an engine fitted with an exhaust provided with a divergent.

FIGS. 3A, 3B and 3C illustrate various examples of exhaust lines 30 of well-known outboard engines. The characteristic common to these exhaust lines is their compactness: in fact, the divergent and the convergent, when there is one, are "imbricated" in each other. FIG. 3A shows the case of an exhaust line 30 of a single-cylinder marine engine comprising for example a divergent zone 31 through which the exhaust gases run before spreading through convergent zone 32. The gases escape through the lower part 33 of the exhaust system, that is into the water.

FIG. 3B is different from FIG. 3A in that there are two cylinders instead of only one. A divergent zone and a convergent zone are present.

Finally, FIG. 3C relates to a three-cylinder engine comprising no convergent, the connection and the angular offset between the three cylinders playing the same part.

If one wishes to provide such exhaust lines with at least one catalyst for extracting certain pollutants from the exhaust gases, various locations may be considered.

References 35 and 35' in FIGS. 3A to 3C show possible locations for these catalysts. However, these solutions have the following drawbacks:

The acoustic effects are particularly reduced, or even totally inhibited, by the addition of such catalysts, notably because of the pressure drops they generate in the exhaust line and of the change in the propagation of the wave at the level of the catalyst itself (the latter generally comprises multiple channels of very small section). Engine performances may therefore be markedly reduced, so much so that two-stroke engines lose their characteristics related to a high specific power.

Furthermore, addition of a catalyst implies a temperature rise in the exhaust line, both at the level of the catalyst and downstream therefrom. This heating is related to the amount of pollutants emitted. It may generate catalyst overheating problems, which has a negative influence on its efficiency, its service life, and may even lead to its destruction. Besides, the environment of the exhaust manifold may also be damaged by such an overheating.

Cooling of the wall is therefore provided to remedy the overheating of the exhaust manifold and/or of the cylinder block. However, this cooling system is not sufficient when a catalyst is installed in the exhaust manifold.

In the particular case of an outboard engine (See FIGS. 3A to 3C), water, which may be sea water, is present in the exhaust manifold 33, both for cooling and sound insulation. It is therefore not advisable, in this case, to position a catalyst such as 35 close to the exhaust outlet because water might corrode this catalyst 35.

To avoid this drawback, the catalyst should be placed far from the exhaust outlet, that is close to the engine (See 35' in FIGS. 3A to 3C). But, of course, the temperature of the gases being very high at the combustion chamber outlet, a catalyst (such as 35') positioned directly at this level would be destroyed and burned even faster.

This latter solution is therefore not conceivable.

Besides, the prior art has already disclosed means for avoiding overheating of filters and/or of catalysts installed in exhaust lines.

Thus, document DE-3,406,968 provides two different pipes, one cooled, the other not cooled, which join just upstream from the catalyst and are associated with flow control systems so as to modulate the temperature of the gases running through the catalyst.

French patent FR-A-2,608,677 recommends the use of two manifolds opening at two different levels in the combustion chamber, associated with a distribution means allowing the flow of gases coming from each manifold and crossing a catalyst located downstream from the manifolds to be controlled. The problem at the origin of this invention is related to the time necessary for operating the catalyst during cold startings. The object of this invention is to decrease this time, called "initiation" time, during which the catalyst has no influence on the pollutants contained in the exhaust gases.

SUMMARY OF THE INVENTION

The exhaust line according to the invention allows the drawbacks of the prior art, that is mainly catalyst overheating, cold starting and performance reduction problems, to be remedied.

It should also be reminded that:

The engines to which the invention may be particularly applied are outboard engines for which size constraints are very severe: the exhaust line according to the invention meets this requirement well because of its compactness and of the entire integration of the catalyst.

An exhaust line according to the invention is thus intended more specifically for two-stroke internal-combustion engines, and comprises at least one catalyst positioned close to at least one cylinder of the engine.

According to the invention, the exhaust line further comprises a means located close to the exhaust port of at least one of the cylinders, said means being intended to separate the exhaust line into at least two parts (or branches), one including said catalyst, the other including no catalyst. The exhaust line according to the invention also comprises a means for sealing selectively one and/or the other of said parts as a function of at least one working parameter of the engine.

More particularly, the means for sealing selectively one and/or the other of said branches is positioned upstream and/or downstream from the separation means, with respect to the direction of propagation of the exhaust gases in the exhaust line.

Without departing from the scope of the invention, the catalyst is positioned as close as possible to the zone in which the two branches join.

Preferably, the exhaust line according to the invention also comprises at least one cooling means located close to said catalyst.

According to one embodiment of the invention, the sealing means is a butterfly valve intended, at low load, to seal completely said branch without a catalyst and partly said branch with a catalyst.

According to another embodiment of the invention, the sealing means consists of a shutter located downstream from said separation means and intended to seal selectively one or the other of said branches.

Advantageously, the sealing means may be a butterfly valve capable of sealing said branch containing said catalyst.

In case of utilization in a marine atmosphere, the catalyst may be connected to a positive potential so as to protect it from corrosion.

The invention further relates to the process for treating the exhaust gases associated with the exhaust line.

BRIEF DESCRIPTION OF THE DRAWINGS

Other features and advantages of the present invention will be clear from reading the description hereafter, given by way of non limitative examples, with reference to the accompanying drawings in which:

FIG. 4 is a schematic cross-sectional view of an exhaust line according to the invention, FIGS. 5A and 5B illustrate each in cross-section an embodiment of an exhaust line according to the invention, adapted to an outboard type engine, FIGS. 8 and 8A show each a cross-section, at the level of the cylinder block, of a six-cylinder V-type engine comprising an exhaust line according to the invention, FIGS. 9 and 9A show each a fragmentary cross-section, at the level of the cylinder block, of a six-cylinder V-type engine comprising an exhaust line according to the invention.

DESCRIPTION OF THE PREFERRED EMBODIMENTS

Figure 6:
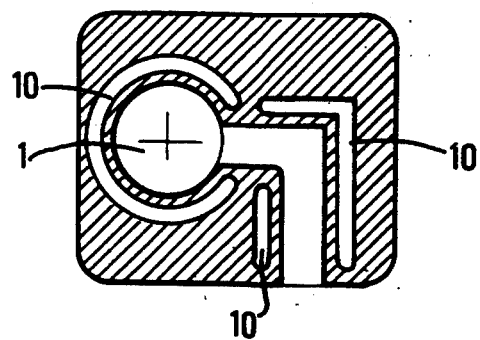
FIG. 6A is a fragmentary cross-section, at the level of the cylinder block, of a two-stroke outboard engine according to the prior art.
FIG. 6B is a fragmentary cross-section, at the level of the cylinder block, of a two-stroke outboard engine provided with an exhaust line according to the invention.

FIG. 4 illustrates the general lay-out of an exhaust line according to the invention.

Cylinder 1 is provided with an exhaust port 2 from which a single exhaust line 3 starts. Close to port 2, the exhaust line 3 is, according to the invention, divided into two parts 4, 5. One of the parts, 4, includes a catalyst 6, and the other (or second) part, 5, comprises no catalyst. Preferably, according to this embodiment of the invention, the sections of each part 4, 5 are constant and have substantially the same value.

The two branches 4, 5 join then downstream from catalyst 6 and form a single line 8 which is preferably followed by a divergent 31, then possibly by a zone of constant section and by a convergent 32, as it is conventional in the prior art.

The catalyst 6, of any type known in the art, preferably occupies the total section of the part (or branch) 4 in which it is located. Besides, it is preferably located close to the zone in which the two branches 4, 5 join, so that the hot gases coming out of branch 4 may initiate an afterburning of the gases coming out of branch 5 with no catalyst.

A sealing means 7, 7' may be provided so as to seal selectively one, 4, or the other, 5, of the branches, according to the working conditions of the engine.

This sealing means may be located just upstream from the manifold division (Ref.7 in FIG. 4), or downstream from said division (Ref.7') at the level where the two branches 4, 5 join. Without departing from the scope of the invention, the two locations may be provided simultaneously with a sealing means 7, 7'.

As explained in a more detailed way hereafter, the sealing means is here intended to seal selectively one and/or the other of the branches 4, 5 as a function of the working conditions of the engine.

Thus, upon starting of the engine or, more generally, while running at low load, since the engine needs no acoustic effects to improve its performances, the sealing means 7, 7' will be positioned in such a way that most, and preferably all of the exhaust gases pass through the catalyst 6 via branch 4: sealing of branch 5.

Depollution of the exhaust gases is therefore optimum, without any negative effect since, in this running stage, engine power is not specifically sought.

Conversely, when performances are sought (full load running), the means 7, 7' is (or are) progressively led to seal more or less partly the branch 4 including the catalyst, so that the major part of the exhaust gases meets no obstacle but, on the contrary, a geometry (divergent-convergent) likely to generate an optimum acoustic effect: depression, then compression of the wave produced by the opening of exhaust port 2. Thus, no pressure drop disturbs the flow.

Moreover, overheating of the catalyst 6 is avoided at full load since the amount of exhaust gases crossing it is small.

Preferably, the line 4 including catalyst 6 will never be totally closed so that, on the one hand, catalyst 6 is always kept active and, on the other hand, the very hot gases which have crossed catalyst 6 may, when they reach the common line 8, initiate a natural afterburning of the exhaust gases which have passed through line 5.

The opening of sealing means 7, 7' has to be judiciously chosen so as to obtain the effects mentioned above.

FIGS. 5A and 5B show each a specific application example relating to a single-cylinder outboard engine. The exhaust line consists of a known part 30, such as that described, for example, in the introduction above, said known part 30 being located downstream from the zone comprising at least one catalyst.

According to the embodiment of the invention shown in FIGS. 5A and 5B, catalyst 6 is located near to the exhaust port, that is near to the engine cylinder. It is therefore far from the water level, which is favourable for avoiding corrosion problems, and its overheating may still be avoided as shown above. Furthermore, catalyst 6 is totally integrated in the cylinder block, which is entirely positive in terms of size problems, which are always acute in engines and particularly in outboard two-stroke engines.

One may see, in FIGS. 5A and 5B, that a wall 9 divides longitudinally line 3 at the cylinder outlet, creating thereby two branches 4, 5 such as those described previously.

In these figures, a single sealing means 7' is present in this part of the exhaust line, this sealing means being positioned downstream from separation wall 9.

Sealing means 7' may be a simple shutter such as that shown in FIG. 5A. According to an advantageous characteristic of the invention, the length of shutter 7' will be judiciously selected so that it may seal completely branch 5 without sealing totally branch 4.

Sealing means 7' may also consist of a butterfly valve, as shown in FIG. 5B, which may open or close simultaneously the two branches: in position "a", the two branches are free, which is preferred for high load conditions and maximum engine performances.

In position "b", branch 5 is totally sealed while branch 4 is only partly sealed. This is to be achieved when the load decreases, all the gases passing then through the catalyst.

Finally, in position "c", all the gases still pass through the catalyst, but branch 4 is more and more closed: case of very low loads for which combustion is improved through the effect of the sealing of the exhaust, which produces an exhaust back-pressure at the level of the ports. This back-pressure helps to control the inner bedding of the mixture and improves combustion at low load, hence a decrease in the pollutant emissions, that is of the pollutants to be treated.

Figure 6B:
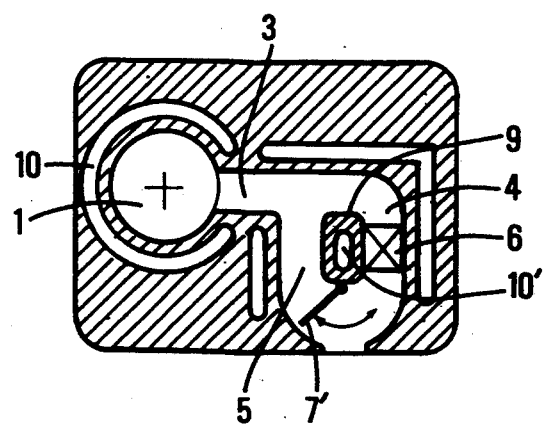

FIGS. 6A and 6B allow another particular feature of the invention, related to the cooling of the catalyst, to be emphasized.

In fact, according to the prior art shown in FIG. 6A, cooling channels 10, in which the water for cooling the engine circulates, are generally present in the engine block.

According to the invention, the environment of catalyst 6 may be cooled through cooling channels 10 since they run close to the outer wall of the catalyst. Furthermore, if the size constraints permit, separation wall 9 will be thick enough to allow a cooling channel 10' to be bored within said separation wall, which will improve the cooling of catalyst 6 even more.

Concerning multi-cylinder engines, an arrangement of the exhaust line according to the invention may be considered.

Figure 7A:
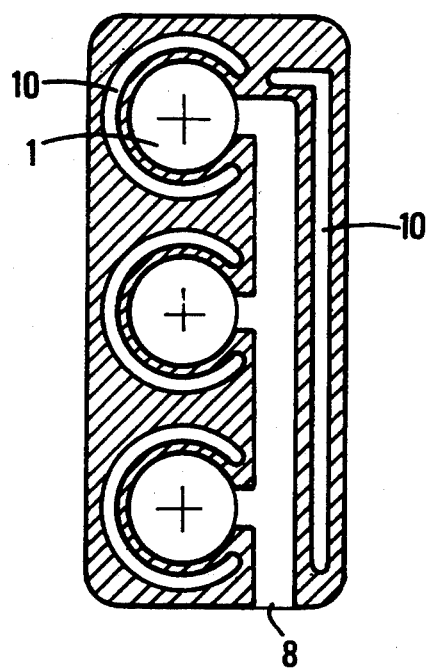
FIG. 7A is a cross-section of a cylinder block of an outboard engine according to the prior art.

FIG. 7A shows a cross-section of a three-cylinder engine according to the prior art, provided with cooling channels 10.

Figure 7B:
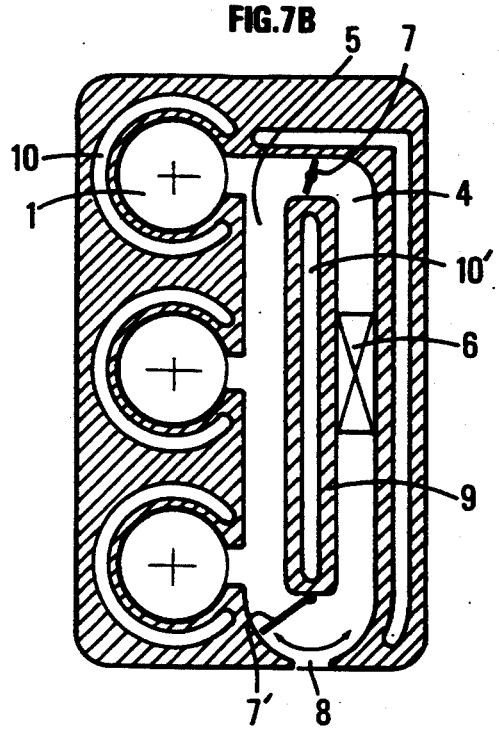
FIGS. 7B and 7C show each, through a cross-section at the level of the cylinder block of an outboard engine, an exhaust line according to the invention.
Figure 7C:
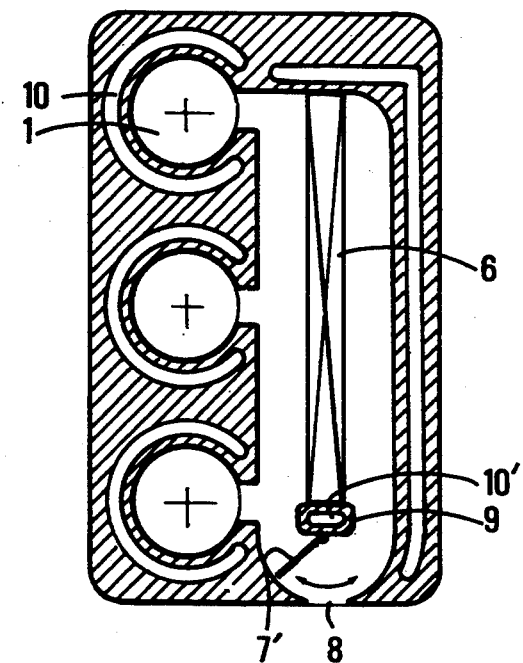

FIGS. 7B and 7C show two possible lay-outs of the exhaust line, in accordance with the invention.

According to FIG. 7B, a separation wall 9 is positioned in the zone where the three lines coming from each exhaust port of each of the cylinders join. Wall 9 is thus intended to separate, as close as possible to each port 2, the exhaust line into two parts 4, 5 as stated previously.

In relation to a conventional engine block such as that shown diagrammatically in FIG. 7A, an engine block according to the invention may be widened so that parts or lines 4 and 5 are wide enough. Besides, separation wall 9 must be thick enough to allow a lamina or small cooling channels 10' to be bored in its thickness.

The conventional cooling channels 10 remain in their usual place.

Catalyst 6 will thus be cooled from both sides.

Sealing means 7' is preferably positioned downstream from the two lines, at the level where common line 8 forms.

According to the embodiment shown in FIG. 7B, catalyst 6 is located near to sealing means 7', which favours initiation of the afterburning of the exhaust gases which do not cross the catalyst by the hot gases coming from the catalyst, as described above.

Optionally, a second sealing means 7 may be provided upstream from the two lines 4, 5 so as to complete the function of the first sealing means 7', according to the working conditions of the engine.

FIG. 7C shows an embodiment of the invention applicable to a well-known cylinder block such as that shown in FIG. 7A for example, and according to which catalyst 6 has the general shape of a volume facing the exhaust ports 2, stretching over the length of the block, arranged close to the exhaust ports and delimiting two lines.

A separation element 9 is present at the end of catalyst 6, preferably provided with an inner cooling line 10'.

This additional cooling means 10' allows the heat generated by catalyst 6 to be decreased, too high a heat radiation to be avoided around the catalyst and therefore a better engine behaviour to be obtained.

A sealing shutter 7' may advantageously be placed downstream from separation element 9 so as to control the flow of the exhaust gases.

Of course, for all the embodiments of the invention which have been described, the part of the exhaust manifold located downstream from the arrangements according to the invention, that is downstream from common line 8, may consist, as it is well-known, of a divergent, then of a convergent. An appropriate geometry will be chosen by the designer of the exhaust line as a function of each particular application.

Finally, FIGS. 8 and 8A, 9 and 9A illustrate each an embodiment of the invention adapted to engines known as V-type engines, that is whose axes of the cylinders coupled two by two form an acute angle. Two blocks having such a V-type lay-out may contain each 1, 2, 3 or 4 cylinders.

Figure 8A:
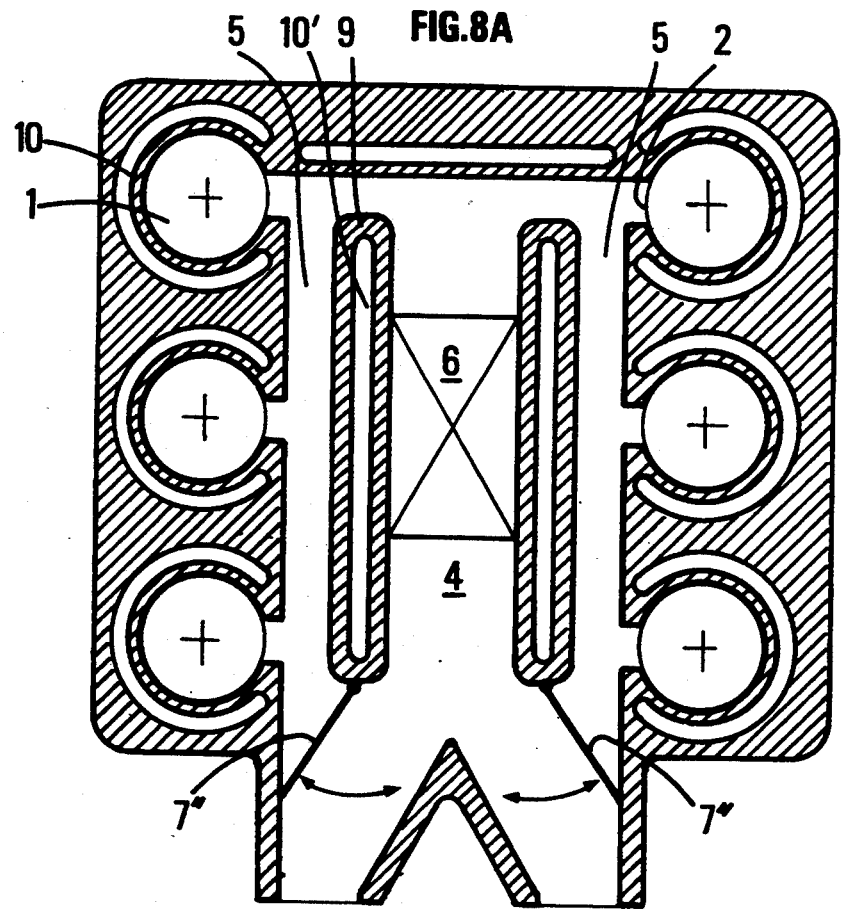
Figure 9A:
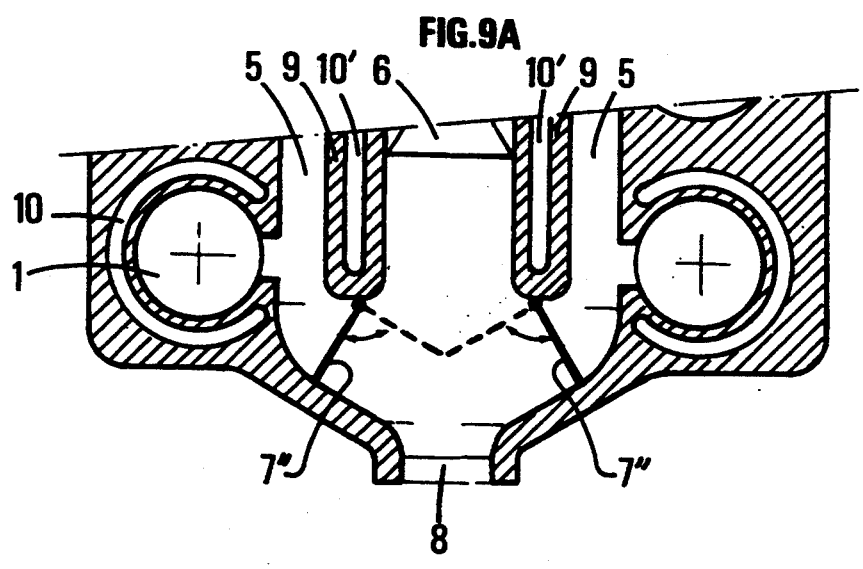

The difference between the embodiments of FIGS. 8, 8A and 9, 9A only lies in the exhaust lines which, according to FIGS. 9 and 9A, join just downstream from the sealing means and which, according to FIGS. 8 and 8A, are distinct for each of the cylinder blocks.

According to the invention, a single catalyst 6 is positioned near to the array of cylinders and more precisely in the centre of the space into which each of the exhaust ports 2 open. More specifically, catalyst 6 comprises, on each of its lateral faces facing ports 2, a separation wall 9 greatly jutting out on either side of the catalyst, so as to form a zone 4 in which the exhaust gases are led to cross the catalyst. Separation walls 9 are preferably cooled by channels 10', as defined above for the previous embodiments.

According to FIGS. 8 and 9, a sealing means 7' may be installed downstream from zone 4, with respect to the direction of propagation of the gases in the exhaust line. It is intended to seal more or less partly zone 4.

According to FIGS. 8A and 9A, sealing means 7' may be replaced by a double sealing means 7'' which is also located downstream from zone 4 and intended to seal selectively zones 4 and 5. Two shutters may be chosen as sealing means.

The embodiments illustrated by FIGS. 8, 8A and 9, 9A are advantageous in that a single catalyst 6 may be used for all the cylinders. Moreover, the lay-out of said catalyst is particulalry advantageous since it may be easily integrated in the cylinder block, without any notable size increase or excessive modification of the engine block. Besides, the conventional cooling fluid used for the engine may be advantageously utilized for cooling the catalyst.

Furthermore, when the branch 4 with the catalyst is sealed, the exhaust is then achieved through two distinct ways.

In all the embodiments considered, that is whatever the type of the engine to which the invention is applied, the selective sealing means 7, 7', 7'' may be controlled through information relating to the temperature of the exhaust gases downstream from the catalyst. Thus, if this temperature becomes so high that the catalyst might overheat, the position of the selective sealing means 7, 7', 7'' may be changed so as to seal the zone including the catalyst more.

Besides, it is well-known in the field of two-stroke engines that a restricting device positioned in the exhaust line allows a back-pressure to be created at the level of the exhaust ports.

This back-pressure will then slow down the emptying of the cylinder into the exhaust line during scavenging and generate different inner aerodynamics, as well as better bedding conditions, notably during running at very low load.

It is therefore very advantageous to be able to control the back-pressure at the level of the exhaust, notably at low load, so as to favour the combustion quality and thus to decrease pollutant emissions by the engine. The embodiment illustrated by FIG. 5B fulfils this characteristic well.

Finally, catalyst 6 may advantageously be placed under a positive electric potential so as to protect it from corrosion in a marine atmosphere. An electric link with the positive potential of the battery is for example provided to that effect.

Of course, the object of the invention as described above may be provided with various modifications and/or additions by the man skilled in the art, without departing from the scope of the present invention.

We claim:

1. An exhaust line for a two-stroke internal-combustion engine which comprises at least one catalyst integrated into a cylinder block of the engine and positioned near to at least one exhaust port of at least one cylinder, at least one means positioned near to the exhaust port of said at least one cylinder and intended to divide the exhaust line into two branches, one branch containing said catalyst and the other branch containing no catalyst, and further comprising at least one first means for sealing selectively at least one of said branches as a function of at least one working parameter of the engine and at least one cooling means positioned inside said cylinder block around said catalyst.

2. An exhaust line as claimed in claim 1, wherein said first means for sealing selectively at least one of the branches is positioned in at least one of downstream and upstream positions from said dividing means with respect to the direction of propagation of the exhaust gases in said exhaust line.

3. An exhaust line as claimed in any one of the previous claims, wherein said catalyst is positioned adjacent to a zone in which the two branches join together.

4. An exhaust line as claimed in claim 1, wherein said sealing means is a butterfly valve intended, at low load, to seal completely the branch containing no catalyst and to seal partly the branch containing the catalyst.

5. An exhaust line as claimed in claim 1, wherein the sealing means consist of a shutter positioned downstream from said dividing means and intended to seal selectively one or the other of said branches.

6. An exhaust line as claimed in claim 1, wherein said sealing means is a butterfly valve capable of sealing the branch containing said catalyst.

7. An exhaust line as claimed in claim 1, wherein said sealing means consists of two shutters capable of sealing selectively one or the other of said branches.

8. An exhaust line as claimed in claim 1, wherein the exhaust line is integrated into an outboard engine.

9. An exhaust line as claimed in claim 8, wherein said catalyst is connected to a positive potential so as to protect the exhaust line from corrosion.

10. An exhaust line as claimed in claim 1, wherein the exhaust line is integrated into a V-type cylinder engine and said catalyst is used for treating exhaust gases from all cylinders of the engine.

* * * * *